United States Patent [19]
Azekawa

[11] Patent Number: 5,345,570
[45] Date of Patent: Sep. 6, 1994

[54] MICROPROGRAM CONTROL CIRCUIT

[75] Inventor: Yoshifumi Azekawa, Hyogo, Japan

[73] Assignee: Mitsubishi Denki Kabushiki Kaisha, Tokyo, Japan

[21] Appl. No.: 862,010

[22] Filed: Apr. 1, 1992

[30] Foreign Application Priority Data

Apr. 2, 1991 [JP] Japan ................... 3-096449

[51] Int. Cl.⁵ .................................... G06F 9/30
[52] U.S. Cl. ......................... 395/375; 364/261D; 364/232.8
[58] Field of Search .......... 395/375, 400, 425, 725, 395/775, 800

[56] References Cited

U.S. PATENT DOCUMENTS

| | | | |
|---|---|---|---|
| 4,093,982 | 6/1978 | Hener et al. | 364/DIG. 1 |
| 4,104,720 | 8/1978 | Gruner | 364/DIG. 1 |
| 4,153,933 | 5/1979 | Blume | 364/DIG. 1 |
| 4,236,210 | 11/1980 | Terakawa | 364/DIG. 1 |
| 4,503,500 | 3/1985 | Magar | 364/DIG. 1 |
| 4,532,587 | 7/1985 | Roskell et al. | 364/DIG. 1 |
| 4,794,558 | 12/1988 | Thompson | 364/DIG. II |

FOREIGN PATENT DOCUMENTS

2199535  2/1990  Japan ................ G06T 9/22

Primary Examiner—David Y. Eng
Attorney, Agent, or Firm—Townsend and Townsend Khourie and Crew

[57] ABSTRACT

In order to make possible expansion or change of the function by microinstruction without revising an instruction decoder in a microprogram control circuit, each time microinstruction memory means is accessed by micro address of the microinstruction selected by the instruction decoder, a microinstruction control circuit activates expansion microinstruction memory means in accordance with an information which is set in an information bit at each microinstruction, and the microinstruction is changed to an expansion microinstruction.

6 Claims, 12 Drawing Sheets

MICRO POINTER 7
MICRO ROM 1
MICRO DATA REGISTER 3
MICRO NEXT ADDRESS REGISTER 10

FIG.17 PRIOR ART

MICRO POINTER 7
MICRO COUNTER 8
MICRO STACK 11

MICROPROGRAM CONTROL CIRCUIT

BACKGROUND OF THE INVENTION

1 Field of the Invention

The present invention relates to a microprogram control circuit for a microprocessor which controls processings in accordance with micro instruction, and more particularly to means for a changing function of the micro instruction.

2. Description of the Prior Art

Figure 11:
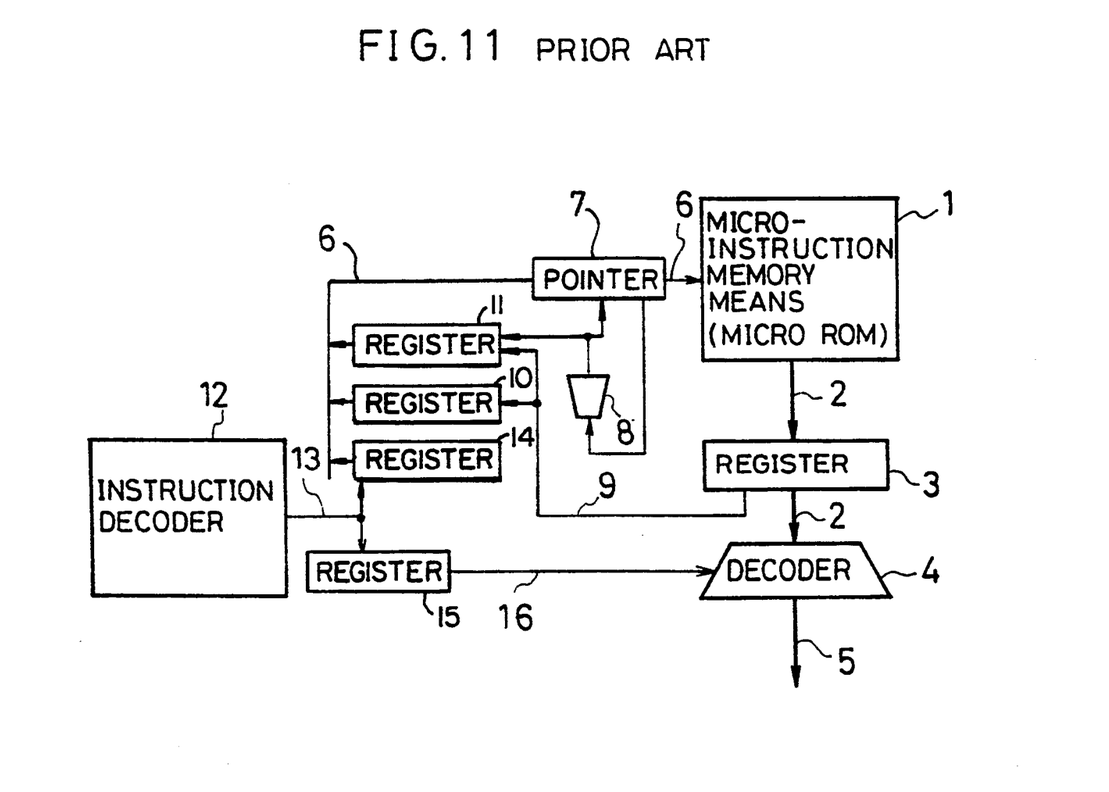
FIG. 11 is a block diagram showing a structure of a conventional microprogram control circuit.

FIG. 11 is a block diagram showing a structure of a conventional microprogram control circuit. In FIG. 11, numeral 1 represents microinstruction memory means (hereinafter referred to as micro ROM) for storing microinstruction, numeral 2 represents micro data indicating the contents of the microinstruction read out from the micro ROM 1, numeral 3 represents a micro data register for holding the micro data, numeral 4 represents a micro decoder for decoding the micro data 2 and parameter information, numeral 5 represents a control signal decoded by the micro decoder 4, numeral 6 represents micro address for designating execution entry of the microinstruction, numeral 7 represents a micro pointer for accessing the micro ROM 1 in accordance with the micro address 6, numeral 8 represents a micro counter for counting up the micro address 6 of the micro pointer 7, numeral 9 represents micro next address for designating next micro address 6 in accordance with contents of an address field in the micro data 2, numeral 10 represents a micro next address register for storing the micro next address 9, numeral 11 represents a micro stack register for storing the micro address 6 of returning place in case of execution of a subroutine in accordance with the microinstruction, numeral 12 represents an instruction decoder for decoding an instruction fetched from outside, numeral 13 represents a decoder code decoded by the instruction decoder 12, numeral 14 represents a micro address register for holding micro address code which designates start entry address of the microinstruction in the decoder code 13, numeral 15 represents a micro parameter register for storing the parameter information of addressing mode and others in the decoder code 13, and numeral 16 represents micro parameter.

Figure 12:
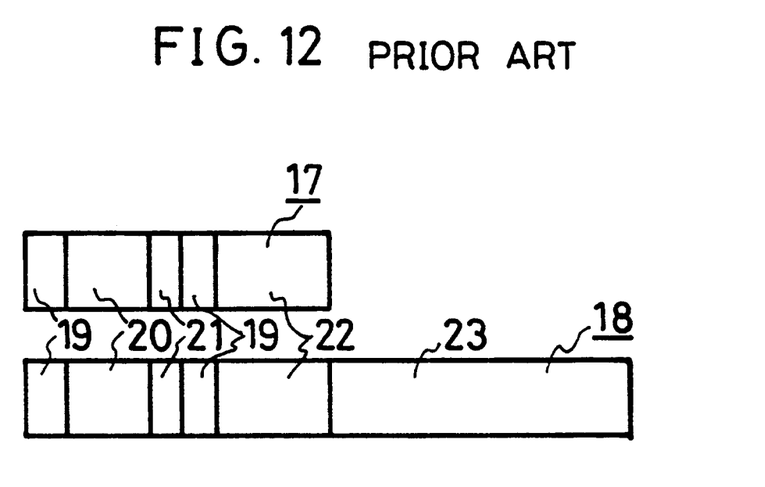
FIG. 12 is a diagram showing an instruction format.

FIG. 12 is a diagram showing instruction format for illustrating selecting method of start entry of the microinstruction at each instruction in the conventional example. In FIG. 12, numeral 17 denotes 1-word instruction, numeral 18 denotes 2-word instruction, numeral 19 denotes op codes for defining instruction operation, numeral 20 denotes destination fields for designating address of destination data and access method, numeral 21 denotes size fields for designating the size of source data, numeral 22 denotes source fields for designating address of the source data and access method, and numeral 23 denotes an expansion field to be designated at the source field 22.

Figure 13:
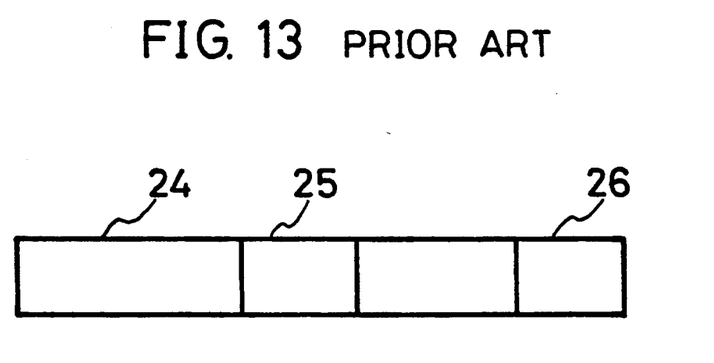
FIG. 13 is a diagram showing an entry structure of a horizontal microinstruction.

FIG. 13 is a diagram of an entry structure of a horizontal microinstruction. In FIG. 13, numeral 24 denotes a microinstruction, numeral 25 denotes a micro address field for designating the micro address 6 of next microinstruction, and numeral 26 denotes a micro sequence field for designating a processing sequence of the microprogram.

The operation of the conventional example will be explained referring to FIGS. 11, 12, and 13 hereinafter. A generating method of the decoder code 13 will be firstly explained. An instruction fetched from an external memory device (not shown) is sent to the instruction decoder 12. At the instruction decoder 12, the type of the instruction is specified by the op code 19, so that the micro address code corresponding to the start entry of the microinstruction 24 is generated. At the same time as the generation of the micro address code, parameter information code is generated in accordance with the addressing mode and register number for accessing the source data and the destination data to be designated at the destination field 20 and the source field 22 and with the size information of the source data to be designated by the size field 21. The micro address code and the parameter information code are outputted from the instruction decoder 12 as the decoder code 13. The micro address code is stored in the micro address register 14 and the parameter information code is stored in the micro parameter register 15.

When there is additional information such as offset information and immediate data for an addressing mode to access the source data by the 2-word instruction 18, differing from the 1-word instruction 17, those information is given as the expansion field 23 designated at the source field 22. The size of the expansion field 23 (1 word) and whether the expansion field 23 exists or not are also given to the decoder code 13 together with the addressing mode and register number as a parameter information code of the source field 22. Therefore, the start entry of the microinstruction 24 to be designated at the op code 19 is not fixed by instruction format. That is, the start entry address of the microinstruction 24 is decided only by the op code 19 irrespective of the contents of the source field 22 and the destination field 20. If the op code 19 shows the same processing contents, the micro address 6 will be identical even in a case of 1-word instruction 17 without the expansion field 23 and 2-word instruction 18 with the expansion field 23.

The read out operation of the microinstruction 24 will be next explained. When the decoder code 13 is inputted in the micro address register 14 and the micro parameter register 15, the read out operation of the micro ROM 1 will be started. Firstly, the micro address 6 is read out from the micro address register 14 and the micro parameter 16 is read out from the micro parameter register 15. The micro address 6 is held in the micro pointer 7 and the micro parameter information 16 is held in the micro decoder 4. The micro pointer 7 accesses the microinstruction of the micro ROM 1 in accordance with the micro address 6 and reads out the microinstruction 24 to the micro data register 3 as a micro data 2.

The operation differs as follows dependent on the obtaining method of the micro address 6 to be executed next to be designated at the micro sequence field 26 of the microinstruction 24.

Firstly, when the microinstruction does not branch, the micro data 2 is outputted to the micro decoder 4 from the micro data register 3. The micro decoder 4 decodes the micro parameter 16 held previously and the micro data 2 so as to generate the control signal 5 for controlling operation device and others. At the same time that the micro data 2 is outputted to the micro decoder 4 from the micro data register 3, next decoder code 13 is set in the micro address register 14 and the micro parameter register 15. When the micro sequence field 26 of the microinstruction 24 indicates a termination of the microinstruction 24, the micro address 6 for processing next instruction is outputted to the micro pointer 7 from the micro address register 14 and the micro parameter 16 is outputted to the micro decoder 4 from the micro parameter register 15, and new microinstruction 24 is read out from the micro ROM 1.

When an instruction decoded at the instruction decoder 12 is to be processed by a plurality of microinstructions 24, the micro address 6 of the micro pointer 7 is counted up by the micro counter 8 until the micro sequence field 26 indicates a completion of the microinstruction 24 concurrently with the reading out of the microinstruction 24 from the micro ROM 1. The The micro address 6 counted up reads out next microinstruction 24.

Further, when the micro sequence field 26 of the microinstruction 24 indicates branching of the microinstruction 24 and the microinstruction 24 branches, that is, when the instruction decoded at the instruction decoder 12 is to be processed by a plurality of microinstructions 24, the micro data register 3 slices off the micro address field 25 of the micro data 2 as a micro next address 9 so as to outputs it to the micro next address register 10. On the other hand, the micro data 2 being sliced off for the micro address field 25 is outputted to the micro decoder 4 from the micro data register 3. The micro decoder 4 generates the control signal 5 in the same way as the above. At this time, the micro pointer 7 reads the micro address 6 from the micro next address register 10 until the micro sequence field 26 indicates non-branching of the microinstruction 24 or termination, and reads out next microinstruction 24.

Lastly, when the micro sequence field 26 of the microinstruction 24 indicates subroutine branching of the microinstruction 24 and the microinstruction 24 performs micro subroutine, that is, when an instruction decoded at the instruction decoder 12 is to be processed by the microinstruction 24 which is common to other instruction, the micro output register 3 slices off the micro address field 25 of the micro data 2 as a micro next address 9 in subroutine jumping place, and transmits to the micro next address register 10. On the other hand, the micro data 2 of which the micro address field 25 is sliced off is transmitted to the micro decoder 4 from the micro data register 3. The micro decoder 4 generates the control signal 5 in the same way as the above. At this time, the micro address 6 of the micro pointer 7 is counted up at the micro counter 8 concurrently and is stored in the micro stack register 11 as a returning address of the micro subroutine. The micro address 6 in the micro subroutine branching place is read in the micro pointer 7 from the micro next address register 10, so as to perform the process which is under subroutine branching. When the micro sequence field 26 indicates the completion of the micro subroutine branching, the micro pointer 7 reads in the micro address 6 of the micro stack register 11 as a returning address of the subroutine, and next microinstruction 24 is read out.

The timing of the above-mentioned operation will be briefly explained referring to FIGS. 14, 15, 16, and 17. In the Figures, numeral 27 indicates processing flow of an instruction I, numeral 28 indicates processing flow of an instruction II, and characters A, B, C, and D indicate operation cycle for reading out the microinstructions. Arrows indicates moving direction of data. Here, the same reference numbers or characters as FIG. 11 denote like functions.

Basically, 4 cycles of A, B, C, and D represent a read out cycle of one microinstruction.

Figure 14:
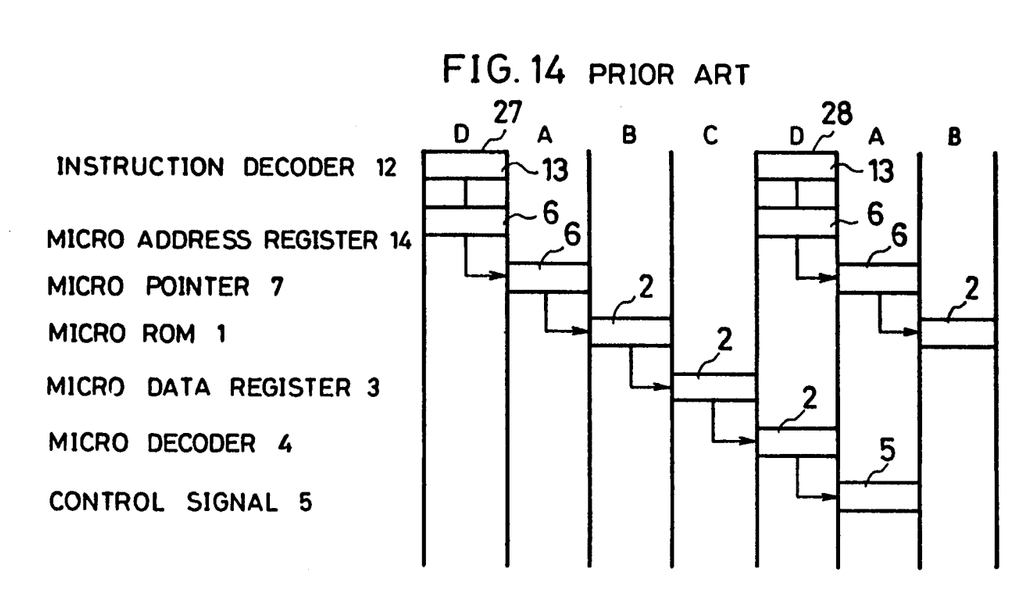
FIG. 14 is a diagram showing operation timing in the conventional example.
Figure 15:
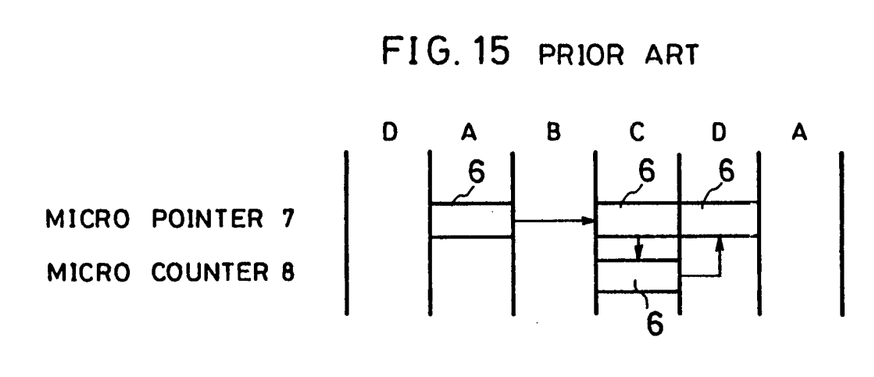
FIG. 15 is a diagram showing operation timing for obtaining micro address in the above conventional example.

Referring to FIG. 14, a case where a process of an instruction decoded at the instruction decoder 12 terminates with one microinstruction will be firstly explained. At the cycle D (the word "cycle" will be omitted hereinafter) prior by one to the start of reading out from the micro ROM 1, the decoder code 13 of the instruction I is outputted from the instruction decoder 12 and the micro address 6 is inputted to the micro address register 14. The micro address 6 is read in to the micro pointer 7 at A, the micro ROM 1 is accessed at B, the micro data 2 is read in the micro data register 3 at C and decoded by the micro decoder 4 together with the micro parameter 16 at D, and the control signal 5 is outputted at next A.

At this time, the decoder code 13 of the instruction II is outputted from the instruction decoder 12 at D and is processed in the same way as the instruction I.

Next, a method for obtaining the micro next address in case of a process to be performed by a plurality of microinstructions will be explained. A case where the microinstruction does not branch will be explained referring to FIG. 15. The micro address 6 of the micro pointer 7 is fetched by the micro counter 8 and counted up at C and delivered to the micro pointer 7 at D. Next microinstruction is accessed by the micro pointer 7 at next B.

Figure 16:
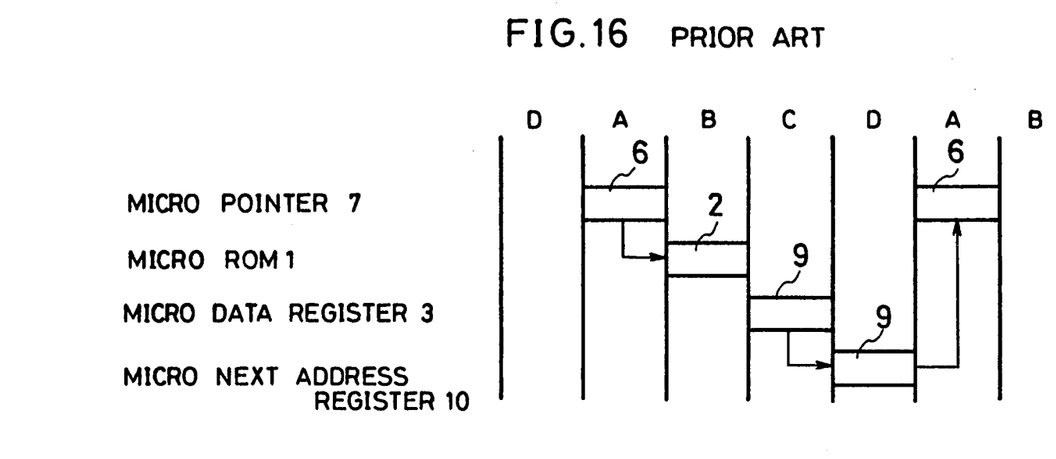
FIG. 16 is a diagram showing operation timing for obtaining micro address in branching place in the above conventional example.

When the microinstruction branches in the same condition, as shown in FIG. 16, the micro next address 9 which is indicated by the address field 25 of the microinstruction sliced off by the micro data register 4 at C is stored in the micro next address register 10. Then, it is delivered to the micro pointer 7 at next A and the microinstruction in branching place is accessed by the micro pointer 7 at next B.

Figure 17:
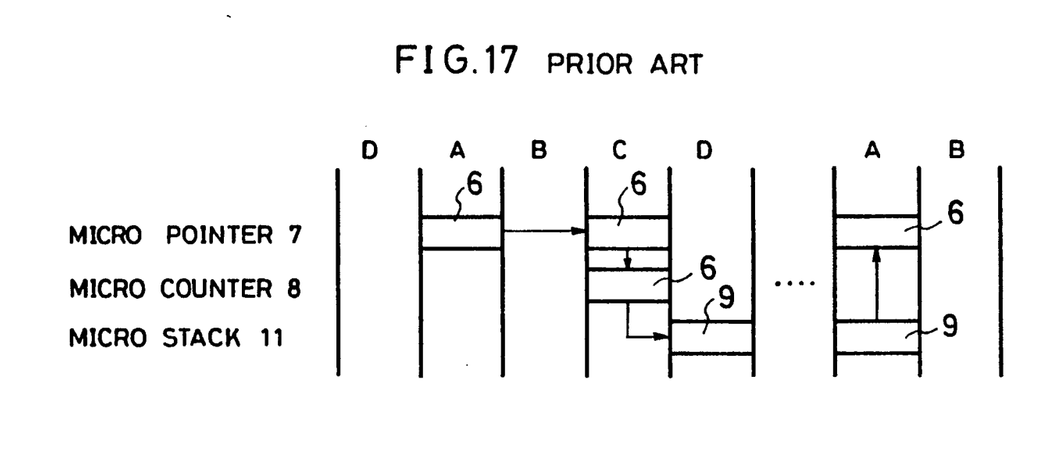
FIG. 17 is a diagram showing operation timing for obtaining micro address in subroutine returning place in the above conventional example.

When the subroutine branches in the same condition, as shown in FIG. 17, the micro address 6 of the micro pointer 7 is fetched by the micro counter 8 at C and counted up, and is delivered to the micro stack register 11 at D. Then, it is delivered to the micro pointer 7 at next A and the microinstruction in the branching place is accessed by the micro pointer 7 at next B.

In the conventional microprogram control circuit, the execution procedure of the microinstruction can be changed by changing the programming of the micro address field and micro sequence field in the microinstructions. It is easily implemented by changing the data for programming in the micro ROM in the process of manufacturing.

However, when new addition of the instruction and expansion or change of the function of the instruction are required, programming is necessary in the added expansion micro ROM on new chips. Consequently, the circuit should be changed widely in order that the instruction decoder can decode the micro address of the micro ROM which is newly expanded.

Accordingly, there are problems in the conventional microprogram control circuit that it takes long time to develop a product provided with new function and manufacturing cost will be increased.

SUMMARY OF THE INVENTION

The object of the present invention, in view of the above-mentioned problems, is to provide a microprogram control circuit in which the expansion and change of the function by the microinstruction are possible without revising the instruction decoder so that the expansion and addition of the instruction function can be performed easily and developing period of the product provided with new function can be shortened as well as reduction of the developing cost.

For this end, the microprogram control circuit according to the present invention, comprises microinstruction memory means 1 for storing microinstruction, an information bit 29 which is to be added as an information to indicate valid/invalid for each microinstruction in the microinstruction memory means 1, expansion microinstruction memory means 32 for expanding said microinstruction and storing expansion microinstruction which differs from the contents of said microinstruction, a micro pointer 7 for accessing said microinstruction in accordance with micro address 6, a microinstruction control circuit 35 for activating said expansion microinstruction memory means 32 in accordance with said information bit 29 corresponding to a pertinent address 6 when said micro address 6 is generated, wherein the function of said microinstruction designated by said micro address 6 is shifted to the function of said expansion microinstruction by said information bit 29.

That is, according to the present invention, every time the microinstruction stored in the microinstruction memory means 1 is accessed by the micro pointer 7 of the micro address 6, the microinstruction control circuit 35 accesses the expansion microinstruction memory means 32 in accordance with the information bit 29, and changes the microinstruction to the expansion microinstruction.

The above and other objects, features, and advantages of the invention will become more apparent from the following description when taken in conjunction with the accompanying drawings.

DESCRIPTION OF THE PREFERRED EMBODIMENT

Figure 1:
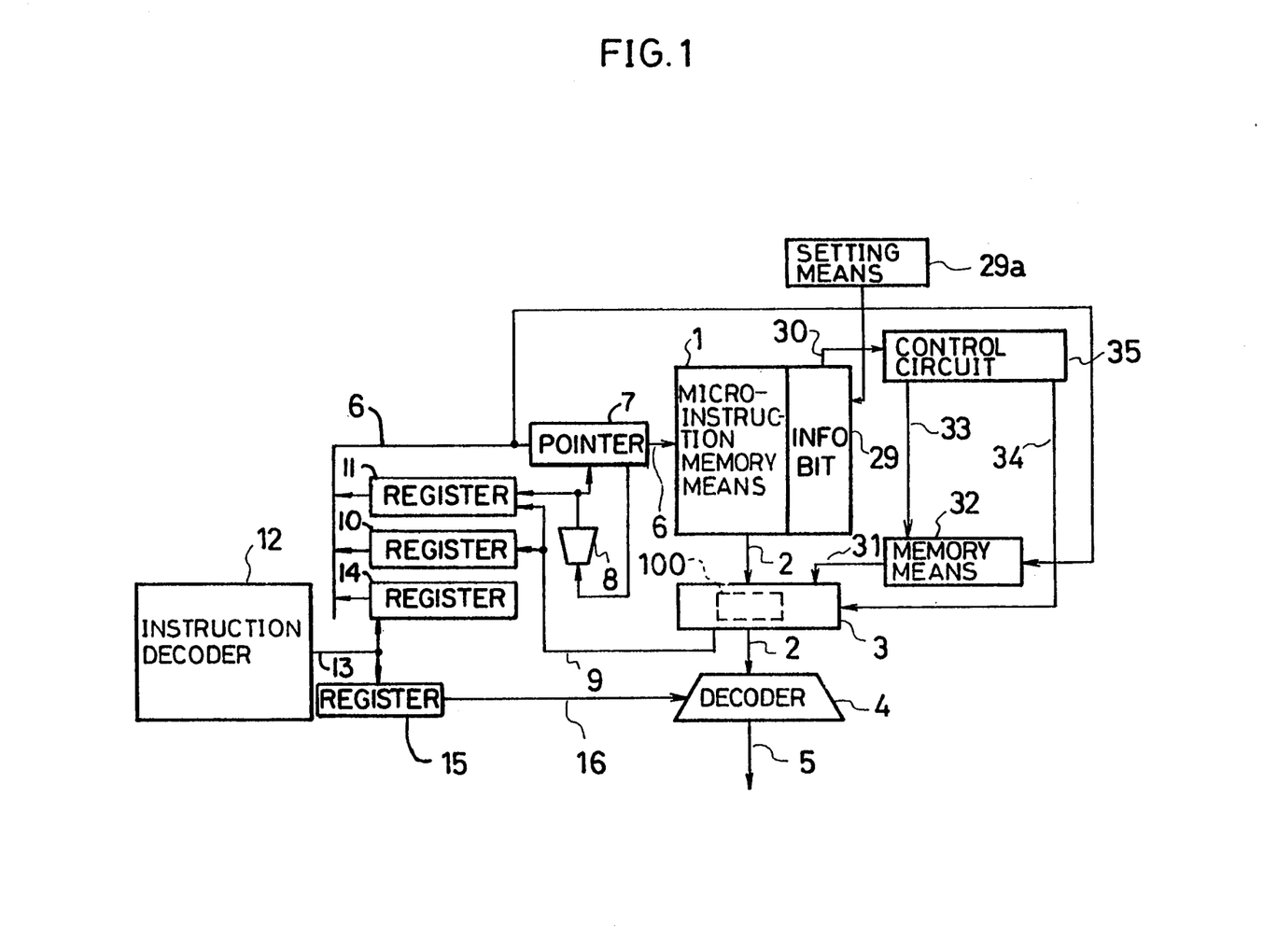
FIG. 1 is a block diagram showing a structure of the microprogram control circuit relating to an embodiment according to the present invention.

FIG. 1 is a block diagram showing a structure of a microprogram control circuit relating to an embodiment according to the present invention. In FIG. 1, the components corresponding to the components shown in FIG. 11 are provided with the same reference marks and the explanation thereof will be omitted. In FIG. 1, numeral 29 represents information bit to be added as an information indicating valid/invalid for each microinstruction in microinstruction memory means 1 (information bit for setting whether the function of the microinstruction is to be changed or not), numeral 30 represents a valid signal for indicating whether the microinstruction accessed is valid (the microinstruction is not to be shifted) or invalid (the microinstruction is to be shifted) in accordance with the information bit 29, numeral 31 represents expansion micro data which can be replaced by the micro data 2, numeral 32 represents expansion microinstruction memory means for storing expansion microinstruction (hereinafter referred to as micro ROM), numeral 33 represents a microinstruction replacing signal for activating the expansion micro ROM 32, numeral 34 represents a selecting signal for selecting data held by a micro data register 3, and numeral 35 represents a microinstruction control circuit for outputting microinstruction replacing signal 33 and selecting signal 34 in accordance with the valid signal 30.

Next, the operation will be explained. In the microprogram control circuit shown in FIG. 1, when a decoder code 13 from an instruction decoder 12 is inputted to a micro address register 14 and a micro parameter register 15, a read out operation starts in the same manner as in the conventional control circuit. Firstly, a micro address 6 is read out from the micro address register 14 and a micro parameter 16 is read out from the micro parameter register 15. At this time, the micro parameter 16 is held by a micro decoder 4 and the micro address 6 is read in a micro pointer 7. The micro pointer 7 reads out microinstruction from the micro ROM 1 in the same manner as the conventional manner. At this time, if the information bit 29 indicates "valid", the function of the accessed microinstruction is to be used as it is, so that the valid signal 30 indicates "valid". The microinstruction control circuit 35 receives the signal and makes the expansion micro ROM 32 disabled in accordance with the microinstruction replacing signal 33. At the same time, the selecting signal 34 controls the micro data register 3 to hold the micro data 2 from the micro ROM 1. Next, when the information bit 29 indicates "invalid", since it means that the function of the accessed microinstruction is to be shifted, the valid signal 30 indicates "invalid". The microinstruction control circuit 35 receives the signal and makes the expansion micro ROM 32 enabled in accordance with the microinstruction replacing signal 33. At the same time, the selecting signal 34 controls the micro data register 3 to hold the expansion micro data 31 from the expansion micro ROM 32. The information bit 29 can be easily changed by setting means 29a.

As in the conventional control circuit, although the operation varies dependent on the way to obtain the micro address 6 to be executed next to be designated at the micro sequence field 26 of the microinstruction 24, the operation is the same as the conventional control circuit excepting that whether the data to be decoded used together with the micro parameter 16 is the micro data 2 or the expansion micro data 31, thereby omitting explanation thereof.

Since the circuit in the present invention operates when the microinstruction is accessed, the processing will be performed in the same manner as shown in the conventional control circuit also in the following two cases: a case where the microinstruction 24 branches and the micro next address 9 of the micro next address register 10 is selected for next micro address 6, and a case where the microinstruction 24 executes a micro subroutine and the micro address 6 of the micro stack register 11 is selected for next micro address 6.

Figure 2:
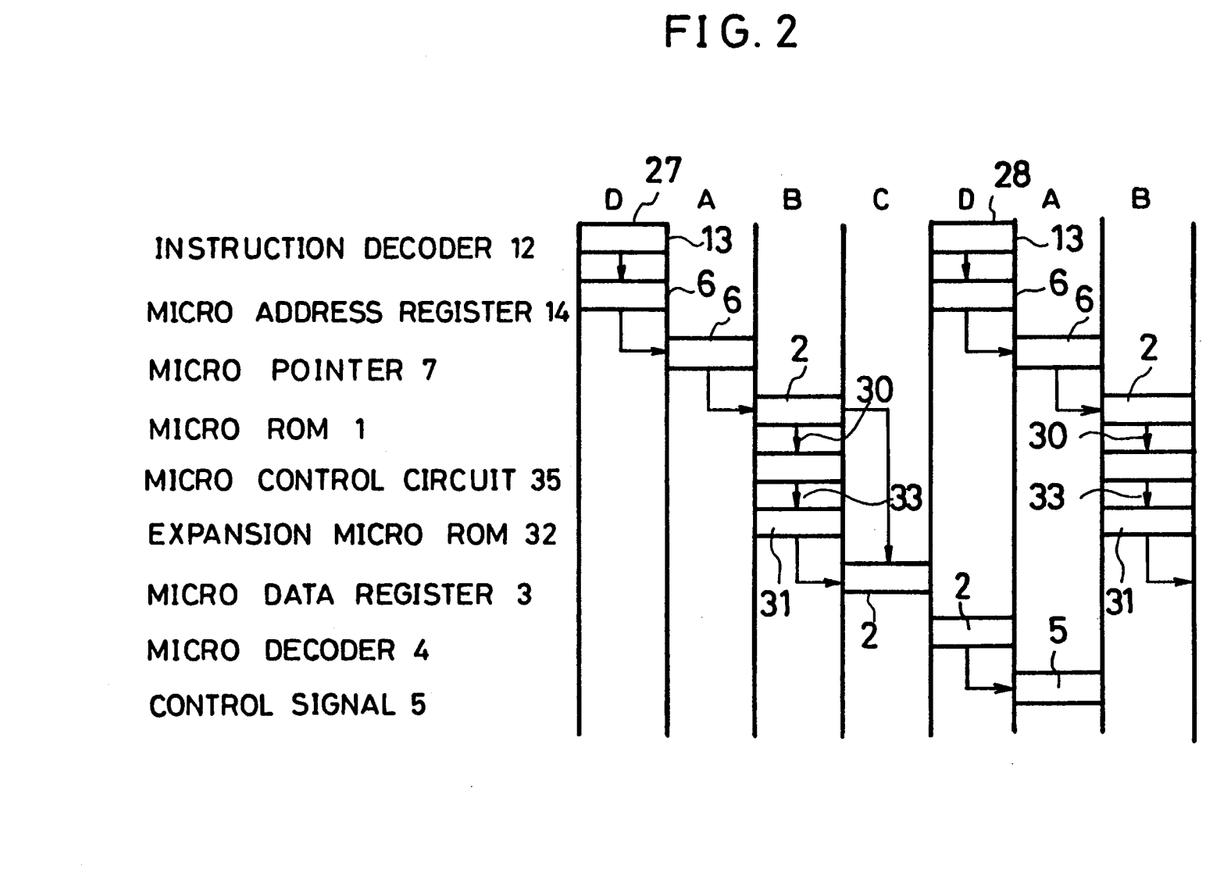
FIG. 2 is a diagram showing the operation timing of the embodiment.

The timing of the above-mentioned operation will be briefly explained hereinafter referring to FIG. 2. The basic timing is the same as the timing shown in the conventional one so that only the parts which differ from the conventional one will be explained. At the same time that the micro ROM 1 is accessed at cycle B, the valid signal 30 is outputted. By this valid signal 30, the microinstruction control circuit 35 outputs the microinstruction replacing signal 33 and the selecting signal 34, so as to activate the expansion micro ROM 32. At cycle C, the micro data register 3 holds the micro data 2 or the expansion micro data 31 in accordance with the selecting signal 34.

Figure 3:
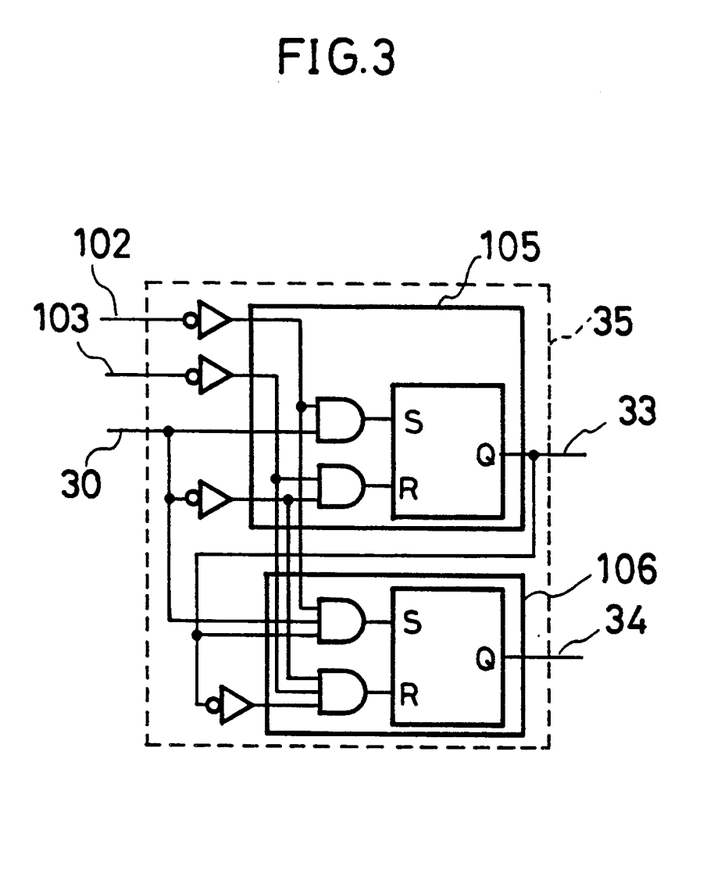
FIG. 3 is a diagram showing an example of a microinstruction control circuit in FIG. 1.

FIG. 3 is a diagram showing circuit of the microinstruction control circuit 35 in FIG. 1. In FIG. 3, numeral 102 represents a clock signal of the cycle B, numeral 103 represents a clock signal of the cycle C, numeral 105 represents a replacing signal generating circuit for asserting the microinstruction replacing signal 33 synchronizing with the clock signal 102 and for negating synchronizing with the clock signal 103 when the valid signal 30 indicates "invalid", and numeral 106 represents a selecting signal generating circuit for asserting the selecting signal 34 together with the assertion of the microinstruction replacing signal 33 synchronizing with the clock signal 102 and for negating together with the negation of the microinstruction replacing signal 33 synchronizing with the clock signal 103 when the valid signal 30 indicates "invalid". The microinstruction control circuit 35 having such a structure, as shown in FIG. 3, is implemented with RS flip-flop, AND gate, and NOT gate.

Figure 4:
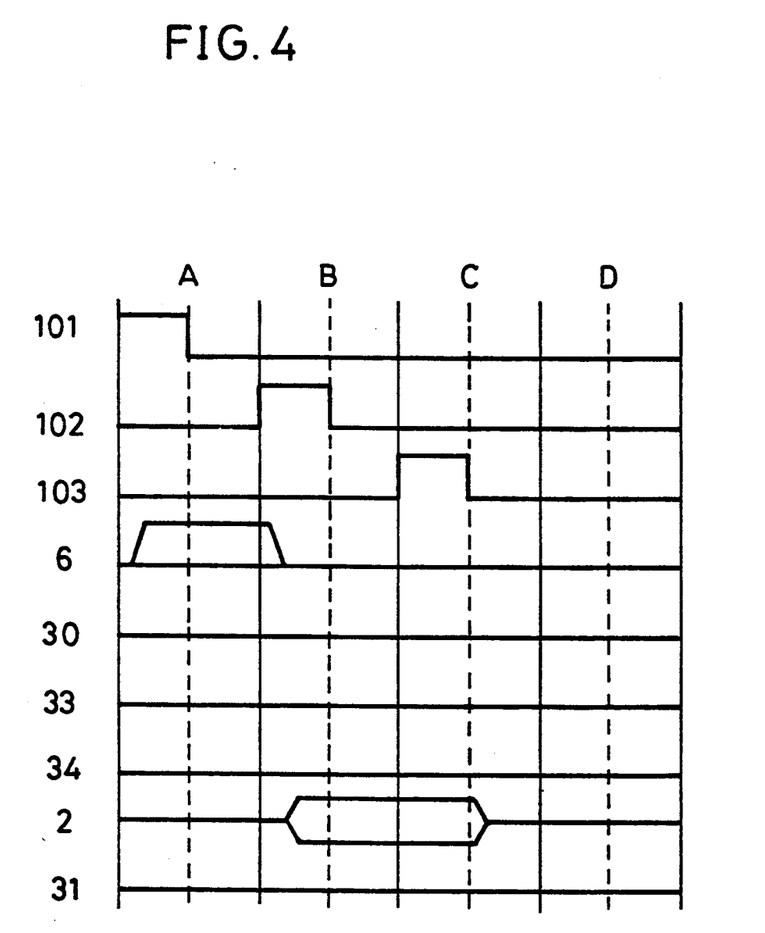
FIG. 4 is an operation timing chart in a case where information bit indicates "valid" in the circuit shown in FIG. 3.

FIG. 4 is a diagram of operation timing in a case where the information bit 29 indicates "valid" in the circuit shown in FIG. 3. Numeral 101 in FIG. 4 indicates a clock signal of the cycle A. Descriptions of others will be omitted since they have been described above.

Figure 5:
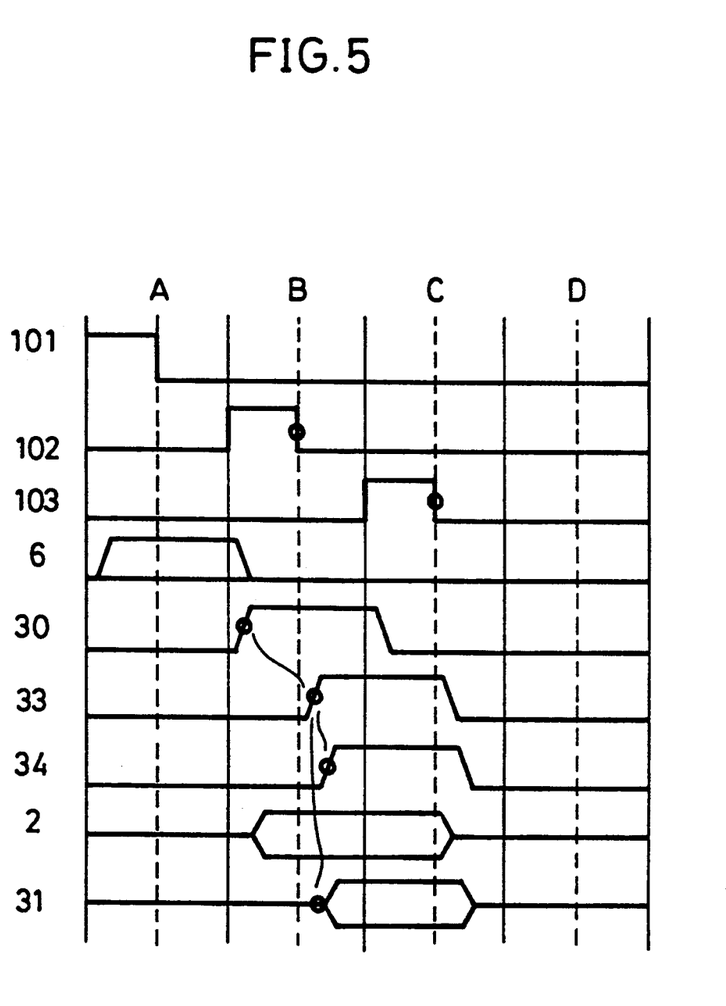
FIG. 5 is an operation timing chart in a case where the information bit indicates "invalid" in the circuit shown in FIG. 3.

FIG. 5 is a diagram of operation timing in a case where the information bit 29 indicates "invalid". In FIG. 5, the components corresponding to the components shown in FIG. 4 are provided with the same marks and explanation thereof will be omitted.

The operation of the microinstruction control circuit 35 will be next explained referring to FIGS. 4 and 5. At the cycle A, the micro address 6 which indicates the start entry address of the microinstruction is delivered to the micro pointer 7. At the cycle B, the micro pointer 7 accesses the micro ROM 1 in accordance with the micro address 6. Then, the micro data 2 is read out from the micro ROM 1. At this time, when the information bit 29 indicates "valid", it means that the function of the accessed microinstruction is to be used as it is, so that the valid signal 30 is not asserted during the period of the cycle B and indicates that the microinstruction is valid. The replacing signal generating circuit 105 of the microinstruction control circuit 35 receives it and does not assert the microinstruction replacing signal 33, so that the expansion micro ROM 32 becomes disabled. Also, since the selecting signal generating circuit 106 does not assert the selecting signal 34 either, the selecting circuit 100 selects the micro data 2 from the micro ROM 1.

When the information bit 29 indicates "invalid", it means that the function of the accessed microinstruction is to be shifted, so that the valid signal 30 is asserted during the period of the cycle B and indicates "invalid" of the microinstruction. Upon reception of it, the replacing signal generating circuit 105 of the microinstruction control circuit 35 asserts the microinstruction replacing signal 33. The expansion micro ROM 32 becomes enabled due to the assertion of the microinstruction replacing signal 33, and a read out of the expansion micro data 31 which indicates the function of the expansion microinstruction corresponding to the micro address 6 is started. At the same time, the selecting signal generating circuit 106 receives the assertion of the microinstruction replacing signal 33 to assert the selecting signal 34. At the cycle C, the selecting circuit 100 selects the expansion micro data 31 from the expansion micro ROM 3 due to the assertion of the selecting signal 34.

Figure 6:
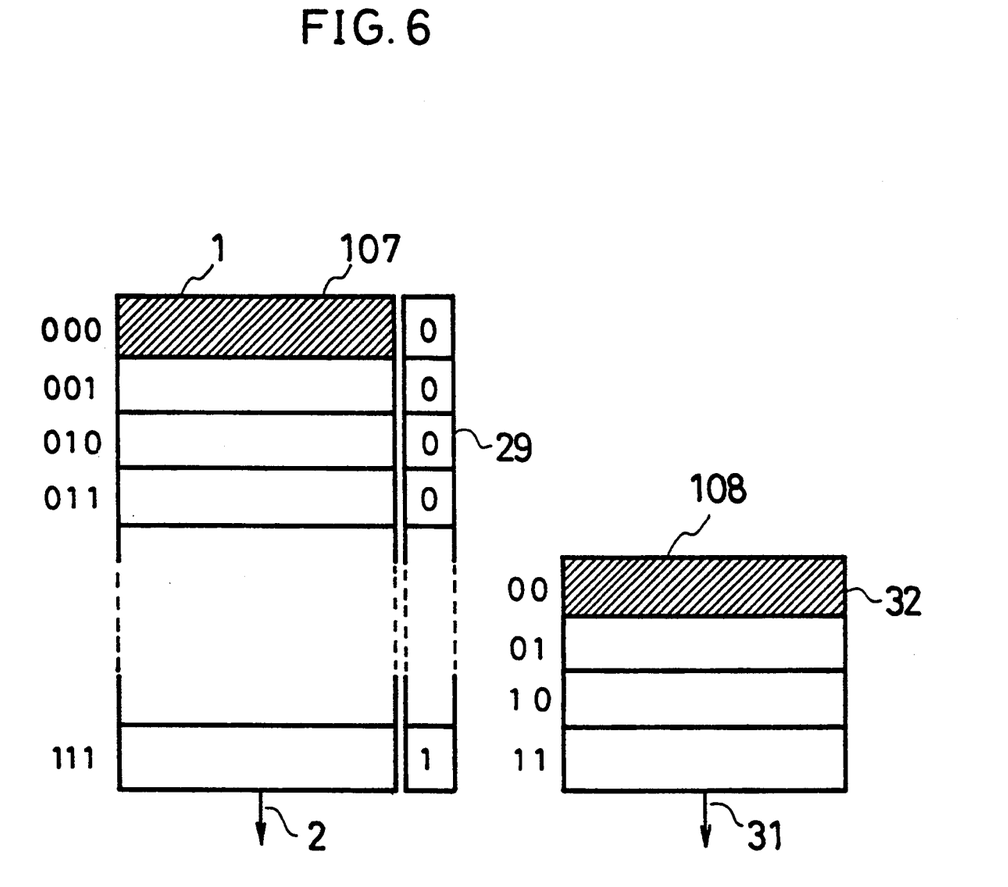
FIG. 6 is a diagram for explaining changing operation of the microinstruction in the above embodiment.

FIG. 6 is a diagram for explaining the changing operation of the microinstruction. In FIG. 6, numeral 107 represents microinstruction to be accessed by the micro address 6, and numeral 108 represents microinstruction to be used being replaced by the microinstruction 107.

The operation will be explained hereinafter referring to FIG. 6. The operation in a case where the microinstruction is to be shifted will be explained, assuming that pertinent microinstruction is invalid when "0" is set for the information bit 29 and the pertinent microinstruction is valid when "1" is set for the information bit 29.

At the same time that the microinstruction 107 is accessed by the micro address 6, the contents of the information bit 29 is also read out. At this time, "0" is set for the information bit 29 which corresponds to the microinstruction 107, so that the microinstruction 107 is invalid and the valid signal 30 indicates "invalid". The microinstruction control circuit 35 receives the valid signal 30 and accesses the microinstruction 108 which corresponds to the micro address 6 among the expansion microinstruction stored in the expansion micro ROM 32. As a result, the micro data 2 is outputted from the micro ROM 1 to the selecting circuit 100 and the expansion micro data 31 is outputted to the expansion micro ROM 32. The selecting circuit 100 receives the selecting signal 34 from the microinstruction control circuit 35 and selects the expansion micro data 31.

Also in a case where a reading out of the microinstruction is performed by micro addresses 001~011, the expansion microinstruction of expansion micro addresses 01~11 is read out as well.

Figure 7:
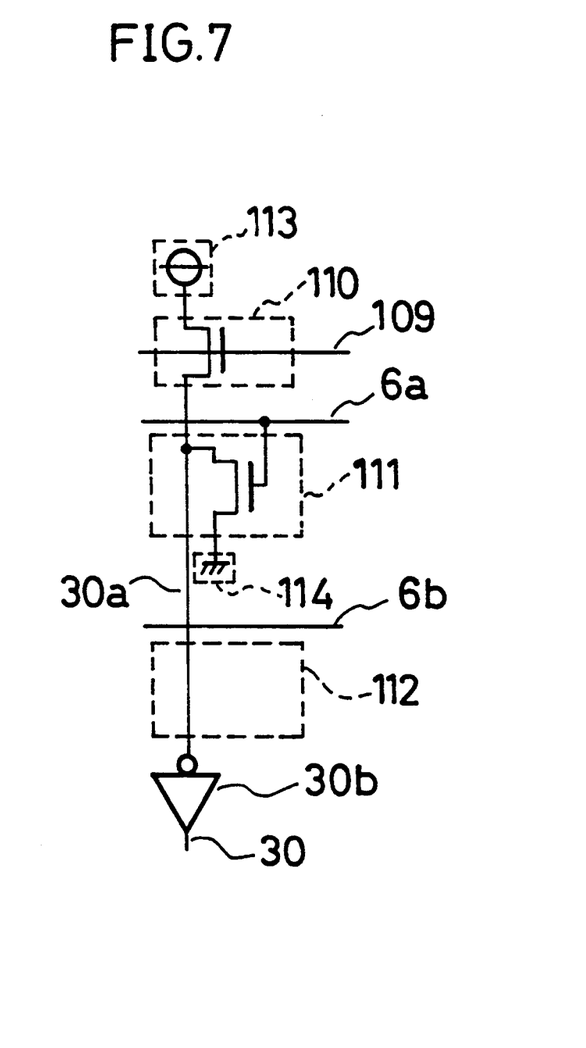
FIG. 7 is a diagram of a circuit relating to an information bit for explaining a setting of the information bit in the above embodiment.

FIG. 7 is a diagram of a circuit for explaining setting of the information bit, in a case where there are 2 types of micro addresses and the information bit 29 is of "1" and "0". In FIG. 7, numeral 109 denotes a clock signal, numeral 110 denotes a pre-charge transistor which is activated (hereinafter referred to as "turned on") by the clock signal 109, numeral 111 denotes a programming gate for setting "1" for the information bit 29, numeral 112 denotes a state where is set for the information bit 29, numeral 113 denotes first power source (hereinafter referred to as Vcc), numeral 114 denotes second power source (hereinafter referred to as GND), numerals 6a and 6b denote word lines to be selected corresponding to the micro address 6, numeral 30a denotes a valid data signal, and numeral 30b denotes a valid signal output buffer.

The operation of the circuit in FIG. 7 will be explained next. Firstly, the pre-charge transistor 110 is turned on by the clock signal 109 at the cycle A, the valid data signal 30a becomes Vcc level, and the valid signal 30 becomes GND level (the microinstruction is valid). At the same time that the word line 6a or the word line 6b corresponding to the micro address 6 which is set in the micro pointer 7 at the cycle B becomes Vcc level, the pre-charge transistor 110 is turned off. When the word line 6a is selected by making the Vcc level as logic 1 and the GND level as logic 0, the word line 6a becomes Vcc level so that the programming gate 111 is turned on and the valid data signal 30a becomes GND level. The valid signal 30 to be outputted from the valid signal buffer 30b becomes Vcc level (to be asserted) to indicate "invalid" of the microinstruction. Likewise, when the word line 6b is selected, since there is not the programming gate 111 to be connected to the valid data signal 30a, the valid signal 30 is kept at the GND level (not asserted) and indicates that the microinstruction is valid.

As for the value of the information bit 29 viewed from the level of the valid data signal line in the above description, the logic will be reversed since the explanation has been done with respect to the value of the information bit 29 viewed from the valid signal line.

Figure 8:
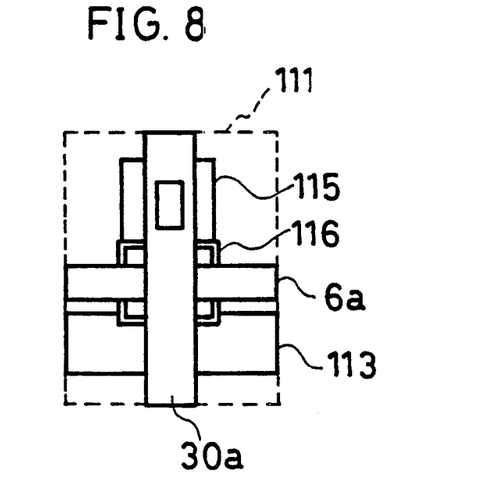
FIG. 8 is a diagram of a layout pattern of a programming gate for setting the information bit to "1" in FIG. 7.
Figure 9:
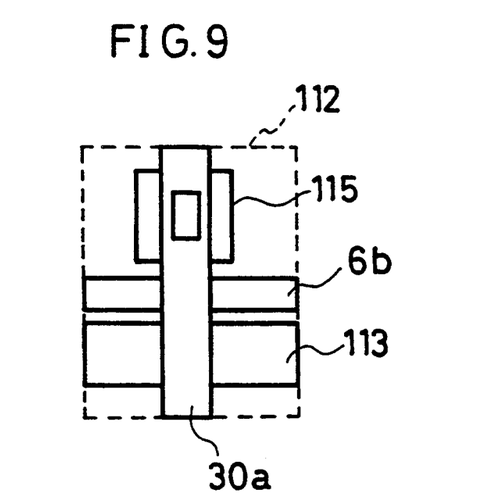
FIG. 9 is a diagram of a layout pattern in a state where the information bit is set to "0" in FIG. 7.

FIG. 8 is a diagram of a layout pattern for the programming gate 111 to set "1" for the information bit 29 in the FIG. 7. Also, FIG. 9 is a diagram of a layout pattern for the state 112 where "0" is set for the information bit 29 in the FIG. 7. In FIGS. 8 and 9, the valid data signal 30a, word line 6a or the word line 6b, Vcc 113 are arranged in varied layers. In FIG. 8, numeral 115 denotes a contact hole for connecting the valid data signal 30a and the programming gate 111 and numeral 116 denotes a diffused layer for forming the programming gate 111.

When "1" is to be set for the information bit 29, as shown in FIG. 8, the diffused layer 116 is formed in the manufacturing process of the device, so that the programming gate 111 is composed. When "0" is to be set for the information bit 29, as shown in FIG. 9, the diffused layer 116 is not formed in the manufacturing process. Thus, the diffused layer is formed in the manufacturing process at every microinstruction so as to set the information bit 29.

Here, it is described that the information bit 29 is set by forming the diffused layer 116. In this case, the diffused layer 116 is formed at the first part in the manufacturing process of the device. Therefore, for example, if the diffused layer is formed so as to correspond to all micro addresses and the forming of the diffused layer is done at the ending part of the manufacturing process in such a manner that the GND 113 is arranged in aluminum distribution, the information bit 29 can be set by 1 manufacturing process (aluminum distribution process in this case). Then, if the device is manufactured until a process prior to the information bit 29, the changing of the information bit 29 at need can be performed in a short time.

Figure 10:
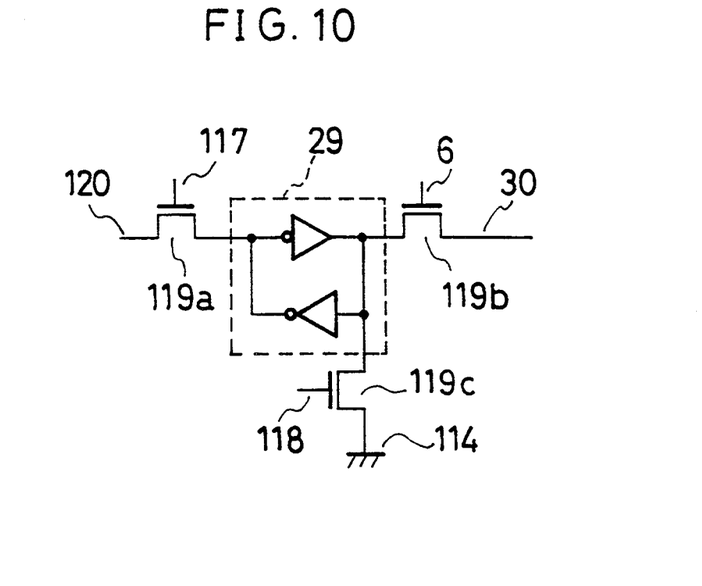
FIG. 10 is a diagram of a circuit relating to the information bit capable of rewriting valid/invalid in the above embodiment.

FIG. 10 is a diagram of a circuit relating to the information bit 29 where rewriting of valid/invalid is possible. In this figure, numeral 117 denotes an information bit writing signal, numeral 118 denotes an information bit clear signal, numerals 119a ~ 119c denote gates, and numeral 120 denotes an information data bus. Other numerals correspond to the parts shown in FIG. 1.

The operation will be explained hereinafter referring to FIG. 10. Firstly, writing operation will be explained. When data is to be written in the information bit 29, the information bit writing signal 117 is asserted so as to turn on the gate 119a, and "0" or "1" is written in the information bit 29 through the information data bus 120. Then, the information bit writing signal 117 is negated so as to hold the information. Next, as for reading out of the information bit 29, the micro address 6 is asserted when the microinstruction is accessed, the gate 119b is turned on so as to output as a valid signal 30.

Also, when the setting of the information bit 29 is to be released, the clear signal 118 is to be asserted. When the clear signal 118 is asserted, the gate 119c is turned on and GND level ("0"=microinstruction is valid) is held for the information bit 29.

Selection of the information bit 29 at the time of writing the information bit may be performed for all microinstructions. However, since the data of "0" or "1" for all microinstructions should be set, there is not so much efficiency in such a case. Therefore, it is preferable that the micro address and value of the information bit 29 are set in exclusive register and others, and the information bit writing signal 117 is combined with the micro address which is set in the exclusive register and decoded so as to select the microinstructions individually.

Further, status flag and the like may be set in said exclusive register so that the information bit writing signal 117 may be asserted when the microinstruction is accessed and be rewritten.

According to the embodiment in FIG. 1, since the setting means 29a which can change the information bit 29 from outside is provided, for example, the device and others for developing the program can be used in common not dependent on systems (an instruction to be masked will not be specified), reducing the manufacturing cost. Further, in appearance, multiple functions can be allotted on the same instruction code, so that the function can be changed dependent on tasks under execution, thereby optimizing the function.

According to the present invention, as described above, the microinstruction control circuit selects the microinstruction to be outputted in accordance with the information bit at every time the microinstruction of the microinstruction memory means is accessed, so that the function of the microinstruction to be masked can be changed to the function of the expansion microinstruction. As a result, the expansion and change of the function dependent on the microinstruction can be performed without revising the instruction decoder. Consequently, the function of the instruction can be easily expanded and added, thereby shortening the developing period of the products having new functions and reducing the cost for developing.

What is claimed is:

1. A microprogram control circuit for a microprocessor which implements the function of an instruction in accordance with microinstructions, where said control circuit comprises:

an instruction decoder for receiving an instruction and generating an entry micro address code when said instruction is decoded, said entry micro address determined by an op code in said instruction;

microinstruction memory means for storing a plurality of microinstructions at storage locations accessed by micro address codes, information bit storage means for storing a unique valid or invalid information bit at storage locations accessed by each micro address code, each unique information bit for indicating whether a microinstruction stored at a storage location accessed by a micro address code is valid or invalid, expansion microinstruction memory means for storing a plurality of expansion microinstructions at storage locations accessed by a portion of each micro address code, a micro pointer, coupled to selectively receive said entry micro address code from said decoder or micro address codes based on accessed microinstructions or expanded microinstructions, for providing said entry micro address code to said microinstruction memory and a portion of said entry micro address code to said expansion microinstruction memory when said instruction is decoded, selection means, coupled to said information bit storage means, said microinstruction memory means, and said expansion microinstruction memory means, for providing an entry microinstruction from a storage location in said microinstruction memory means accessed by said entry micro address code if a valid information bit is accessed by said entry micro address code and for providing an entry expanded microinstruction from a storage location in said expanded microinstruction memory means accessed by said portion of said entry micro address code if an invalid information bit is accessed by said entry micro address code, wherein the function of said microinstruction designated by said entry micro address code is changed to the function of said expansion microinstruction in accordance with said invalid information bit.

2. The microprogram control circuit according to claim 1, comprising setting means, coupled to said information bit storage means, for storing either a valid or invalid information bit in a storage location in said information bit storage means accessed by a selected micro address code.

3. The microprogram control circuit according to claim 1, wherein the microinstruction control circuit comprises:

a replacing signal generating circuit, coupled to receive first and second clock signal and coupled to said expansion microinstruction memory means and said information bit storage means, for asserting a microinstruction replacing signal in synchronism with the first clock signal if said Valid information bit is accessed by said start entry micro address code and negating the microinstruction replacing signal in synchronism with the second clock signal, with an asserted microinstruction replacing signal for enabling said expansion microinstruction memory means to access an expanded microinstruction stored at a storage location accessed by a portion of said start entry micro address code, a selecting signal generating circuit coupled to receive said first and second clock signals and said information bit storage means, for asserting a selecting signal in synchronism with the first clock signal if said valid information bit is accessed by said start entry micro address code and negating the selecting signal in synchronism with the second clock signal, and selection means, coupled to said microinstruction memory means, said expanded microinstruction memory means and said selecting signal generating means, for selecting said expanded microinstruction accessed from said expanded memory means when said selecting signal is asserted.

4. The microprogram control circuit according to claim 1, wherein the microinstruction memory means consists of read only memory.

5. The microprogram control circuit according to claim 1, wherein the expansion microinstruction memory means consists of read-only memory.

6. The microprogram control circuit according to claim 3, wherein the microinstruction control circuit comprises a flip-flop, an AND gate, and a NOT gate.

* * * * *